(12) United States Patent
Ihrig et al.

(10) Patent No.: US 11,048,390 B2
(45) Date of Patent: Jun. 29, 2021

(54) AUTO-REFORMATTING OF HOME SCREEN GRAPHICAL USER INTERFACE DEPICTING ONLY ADMINISTRATOR-APPROVED APPLICATIONS

(71) Applicant: MI Technical Solutions, Inc., Chesapeake, VA (US)

(72) Inventors: Michael L. Ihrig, Chesapeake, VA (US); Ryan C. Loughner, Irwin, PA (US)

(73) Assignee: MI TECHNICAL SOLUTIONS, INC., Chesapeake, VA (US)

( * ) Notice: Subject to any disclaimer, the term of this patent is extended or adjusted under 35 U.S.C. 154(b) by 0 days.

(21) Appl. No.: 17/021,181

(22) Filed: Sep. 15, 2020

(65) Prior Publication Data

US 2021/0081089 A1 Mar. 18, 2021

Related U.S. Application Data

(63) Continuation-in-part of application No. 16/017,290, filed on Jun. 25, 2018, now abandoned.

(51) Int. Cl.
| | |
|---|---|
| *G06F 3/0482* | (2013.01) |
| *G06F 3/0484* | (2013.01) |
| *G06F 3/0481* | (2013.01) |
| *G06F 21/62* | (2013.01) |
| *G06F 9/451* | (2018.01) |
| *G06F 8/61* | (2018.01) |
| *H04M 1/72403* | (2021.01) |

(52) U.S. Cl.
CPC .......... *G06F 3/0484* (2013.01); *G06F 3/0482* (2013.01); *G06F 3/04817* (2013.01); *G06F 8/61* (2013.01); *G06F 9/451* (2018.02); *G06F 21/629* (2013.01); *H04M 1/72403* (2021.01)

(58) Field of Classification Search
CPC .................................................... G06F 3/0482
See application file for complete search history.

(56) References Cited

U.S. PATENT DOCUMENTS

| | | | | |
|---|---|---|---|---|
| 6,389,447 B1 * | 5/2002 | Singh | .................... | G06F 9/4881 718/100 |
| 8,942,692 B2 * | 1/2015 | Randazzo | ............... | H04L 67/22 455/418 |
| 9,071,958 B2 * | 6/2015 | Mullins | ................. | H04W 12/08 |
| 9,213,538 B1 * | 12/2015 | Ladd | .................... | H04N 21/431 |

(Continued)

*Primary Examiner* — Daniel Rodriguez
(74) *Attorney, Agent, or Firm* — Peter J. Van Bergen

(57) ABSTRACT

A GUI reformatting application is installed on a host computer and a mobile computer. Once activated, a first list of the user applications installed on the mobile computer is automatically transmitted to the host computer over a network. Selections of the user applications in the first list are received at the host computer wherein each selection identifies one of the user applications that is approved for enablement at the mobile computer. A second list of enabled user applications is generated at the host computer where the enabled user applications consist of those user applications identified by the selections made at the host computer. The second list is transmitted to the mobile computer and the home screen GUI on the mobile computer is then automatically reformatted to display only the launch icons associated with the enabled user applications.

19 Claims, 10 Drawing Sheets

(56) References Cited

U.S. PATENT DOCUMENTS

| | | | | |
|---|---|---|---|---|
| 2008/0307339 A1* | 12/2008 | Boro | ............... | H04L 63/08 |
| | | | | 715/764 |
| 2009/0018731 A1* | 1/2009 | Grenell | ............... | B60R 16/03 |
| | | | | 701/51 |
| 2010/0050176 A1* | 2/2010 | Vanderpool | ......... | G06F 11/1438 |
| | | | | 718/100 |
| 2010/0153951 A1* | 6/2010 | Jones | ............... | G06F 9/442 |
| | | | | 718/100 |
| 2011/0185355 A1* | 7/2011 | Chawla | ............ | G06F 9/5077 |
| | | | | 718/1 |
| 2012/0167159 A1* | 6/2012 | Mefford, Jr. | ......... | G06F 21/121 |
| | | | | 726/1 |
| 2012/0185910 A1* | 7/2012 | Miettinen | ............... | G06F 21/31 |
| | | | | 726/1 |
| 2013/0031191 A1* | 1/2013 | Bott | ............... | H04L 43/04 |
| | | | | 709/206 |
| 2013/0258042 A1* | 10/2013 | Shun | ............... | H04L 67/22 |
| | | | | 348/14.08 |
| 2013/0295872 A1* | 11/2013 | Guday | ............... | H04W 4/90 |
| | | | | 455/404.1 |
| 2013/0295913 A1* | 11/2013 | Matthews, III | ... | H04M 1/72457 |
| | | | | 455/420 |
| 2013/0303143 A1* | 11/2013 | Schrader | ............... | H04W 8/22 |
| | | | | 455/418 |
| 2014/0047512 A1* | 2/2014 | Sidi | ............... | G06Q 10/06 |
| | | | | 726/4 |
| 2014/0059703 A1* | 2/2014 | Hung | ............... | G06F 8/61 |
| | | | | 726/28 |
| 2014/0068755 A1* | 3/2014 | King | ............... | G06F 21/53 |
| | | | | 726/19 |
| 2014/0283142 A1* | 9/2014 | Shepherd | ............ | G06F 21/6245 |
| | | | | 726/30 |
| 2015/0056974 A1* | 2/2015 | Kim | ............... | G06F 9/451 |
| | | | | 455/418 |
| 2015/0121363 A1* | 4/2015 | Quintana | ............ | H04L 67/1095 |
| | | | | 717/177 |
| 2015/0220734 A1* | 8/2015 | Nalluri | ............... | G06F 21/6218 |
| | | | | 726/23 |
| 2016/0085841 A1* | 3/2016 | Dorfman | ............... | G06F 9/468 |
| | | | | 707/738 |
| 2016/0269412 A1* | 9/2016 | Farah | ............... | H04L 63/10 |
| 2017/0206525 A1* | 7/2017 | Sylvain | ............ | G06Q 20/40145 |
| 2017/0359715 A1* | 12/2017 | Schultz | ............... | G09B 7/00 |
| 2018/0059881 A1* | 3/2018 | Agboatwalla | ............ | F25D 29/00 |
| 2020/0311173 A1* | 10/2020 | Zhao | ............... | H04L 67/146 |

* cited by examiner

AUTO-REFORMATTING OF HOME SCREEN GRAPHICAL USER INTERFACE DEPICTING ONLY ADMINISTRATOR-APPROVED APPLICATIONS

This application is a continuation-in-part and claims the benefit of U.S. patent application Ser. No. 16/017,290 filed Jun. 25, 2018, the entirety of which is incorporated by reference herein.

FIELD OF THE INVENTION

The invention relates generally to remote management of mobile computing devices, and more particularly to a method for automatically reformatting the home screen Graphical User Interface (GUI) of a mobile computing device such that only applications approved of at a host computing device are depicted on the mobile computing device's home screen GUI.

BACKGROUND OF THE INVENTION

Mobile wireless communication devices to include smartphones, smartwatches and other wearable devices, tablets, etc., have users of all ages to include early teenagers and even pre-teens. These devices provide access to communication (e.g., talk, text, video chat, etc.) and to the internet anywhere there is cellular or WiFi connectivity. With advances in wireless technology to include cellular and WiFi, connectivity is available almost everywhere to users of mobile communication devices.

While all of the above technologies provide a number of advantages for communication, education, work efficiencies, entertainment, and convenience, there are numerous challenges presented to parents and employers whose children and employees, respectively, use these technologies. For the parent, there is great concern about what apps will be run by a child that can impact their mental and physical health as well as situations when the device can be used. For the employer, there is great concern about use of employer-provided devices to run non-work-related apps that can impact employee safety and efficiency. Unfortunately, the number of readily-available apps increases daily such that parent or employer monitoring of multiple devices becomes a full-time job that is nearly impossible to perform effec-

SUMMARY OF THE INVENTION

Accordingly, it is an object of the present invention to provide a method and system for the management of mobile computing devices.

Another object of the present invention is to provide a method and system that parents or employers can rely on to remotely manage selected mobile devices to promote safe use thereof by children or employees, respectively.

Other objects and advantages of the present invention will become more obvious hereinafter in the specification and drawings.

In accordance with the present invention, a method is provided for reformatting a home screen Graphical User Interface (GUI) on a mobile computer to depict only applications approved of at a host computer. A GUI reformatting application is provided to a subscriber for installation on a host computer and a mobile computer. The GUI reformatting application is activated on the host computer and receives a key code over a network. The GUI reformatting application is activated on the mobile computer upon entry of the key code on the mobile computer. The mobile computer has user applications installed thereon and has a home screen GUI displaying launch icons associated with the user applications. A first list of the user applications installed on the mobile computer is automatically transmitted to the host computer over the network. A display of the first list is automatically generated on the host computer. Selections of the user applications in the first list are received at the host computer wherein each of the selections identifies one of the user applications that are approved for enablement at the mobile computer. A second list of enabled user applications is generated at the host computer where the enabled user applications consist of those user applications identified by the selections made at the host computer. The second list is transmitted to the mobile computer over the network. The home screen GUI on the mobile computer is then automatically reformatted to display only the launch icons associated with the enabled user applications.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Prior to describing embodiments of the present invention, several terms as used herein will be defined. The terms "mobile computing device", "mobile device" and/or "mobile computer" refer to any of a variety of hand-held or wearable devices capable of wirelessly communicating over a network with users of similar devices, accessing services over a network, running/processing apps downloaded on the device or accessible over a network, etc. The term "administrator" will be used to define a parent or guardian, employer, or any other individual or entity with a need to implement management of one or more mobile devices in accordance with the present invention. The term "protégé" will be used to define a person (e.g., child, employee, etc.) under the patronage, protection, or care of an administrator who is interested in the welfare and/or work efforts of the protégé. The term "network" as used herein can be any network to include those that are personal, local, geographically-restricted, cellular, global, etc., and includes networks used for voice/text/video communication and internet access.

Figure 1:
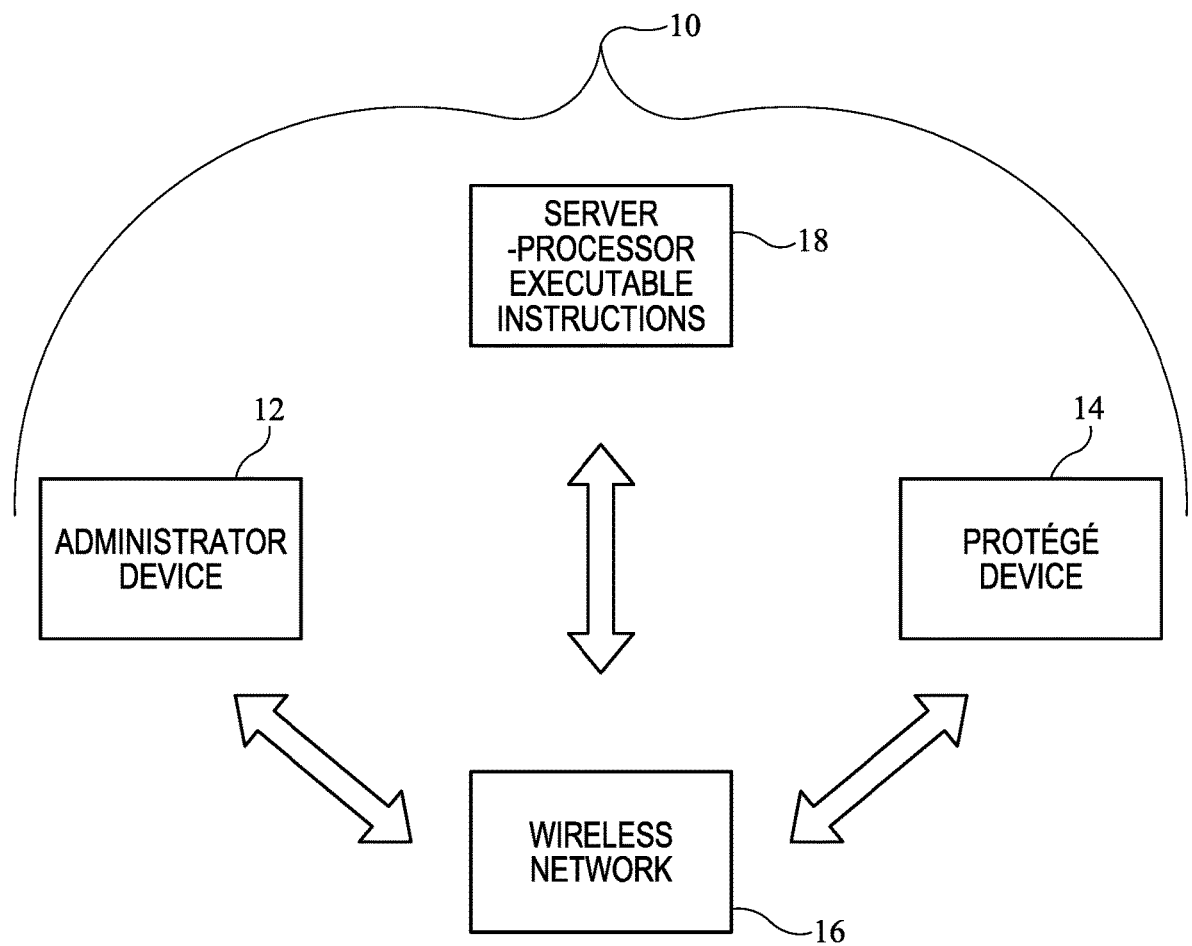
FIG. 1 illustrates exemplary system elements used in remote management of mobile computing devices in accordance with an embodiment of the present invention.

Referring now to the drawings and more particularly to FIG. 1, an exemplary arrangement of system elements used in the present invention is shown and is referenced generally by numeral 10. System elements 10 include a host or administrator device 12, a protégé device 14, a network 16, and a server 18. Administrator device 12 can be associated with one or more protégé devices 14 without departing from the scope of the present invention. For simplicity of illustration, a single administrator device 12 and a single protégé device 14 are shown and will be described herein. In general, wireless communications between administrator device 12, protégé device 14, and server 18 are facilitated by network 16 in ways well-understood in the art and will, therefore, not be described further herein. Such wireless communication is illustrated through the use of two-headed arrows in FIG. 1.

Administrator device 12 can be a mobile computing device such as a smartphone, wearable device, tablet, laptop computer, etc., but can also be a relatively stationary computing device such as a desktop computer without departing from the scope of the present invention. Protégé device 14 will generally be a mobile device and will typically be hand-held or wearable. Network 16 is generally any wireless network as defined previously herein. Server 18 includes hardware and software (i.e., processor-executable instructions) that execute, among other things, the communication and processing instructions associated with the present invention.

Figure 2:
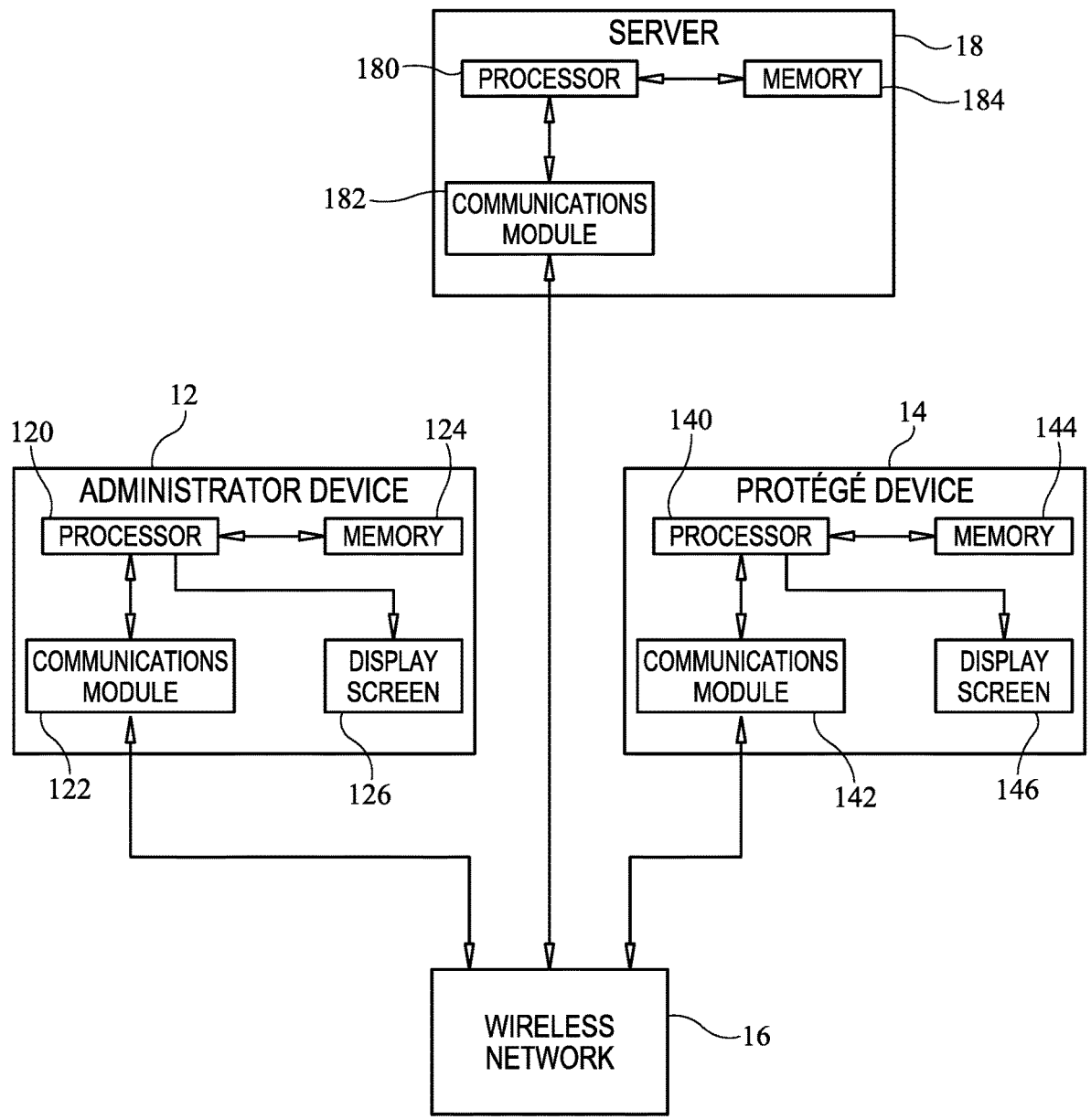
FIG. 2 is a block diagram illustrating exemplary system capabilities of an administrator device, a protégé device, and a server, in accordance with an embodiment of the present invention.

Referring now to FIG. 2, a block diagram is shown illustrating exemplary system capabilities of administrator device 12, protégé device 14, and server 18. For example, in one embodiment, administrator device 12 can include a processor 120, a communications module 122, a memory 124 storing, among other things, executable instructions related to communications, web browsing, etc., that allow a user/administrator to access executable instructions related to the present invention that can be initially stored on and downloaded from server 18, and a display screen 126 for presentation of, among other things, information related to the present invention's home screen reformatting process as will be explained further below.

In one embodiment, protégé device 14 can include a processor 140, a communications module 142, a memory 144 storing, among other things, executable instructions related to a variety of applications to include applications governing communications, web browsing, social media, etc., as well as executable instructions related to the implementation of the present invention that can be initially stored on and downloaded from server 18, and a display 146 for presentation of, among other things, a visually-unique home screen GUI and enabled apps when the present invention's home screen reformatting process is running.

In one embodiment, server 18 can include a processor 180, a communication module 182, and a memory 184 storing information related to authorized users (i.e., authorized administrators and protégé) of the present invention, as well as executable instructions related to the present invention.

Such executable instructions include those accessed by administrators to register for use of the present invention, logging in to the home screen reformatting process, and implementing the administrator's role in the home screen reformatting process. Memory 184 also stores executable instructions that can be downloaded to protégé device 14 after an administrator registers as a participant in the present invention's home screen reformatting process.

Figure 6:
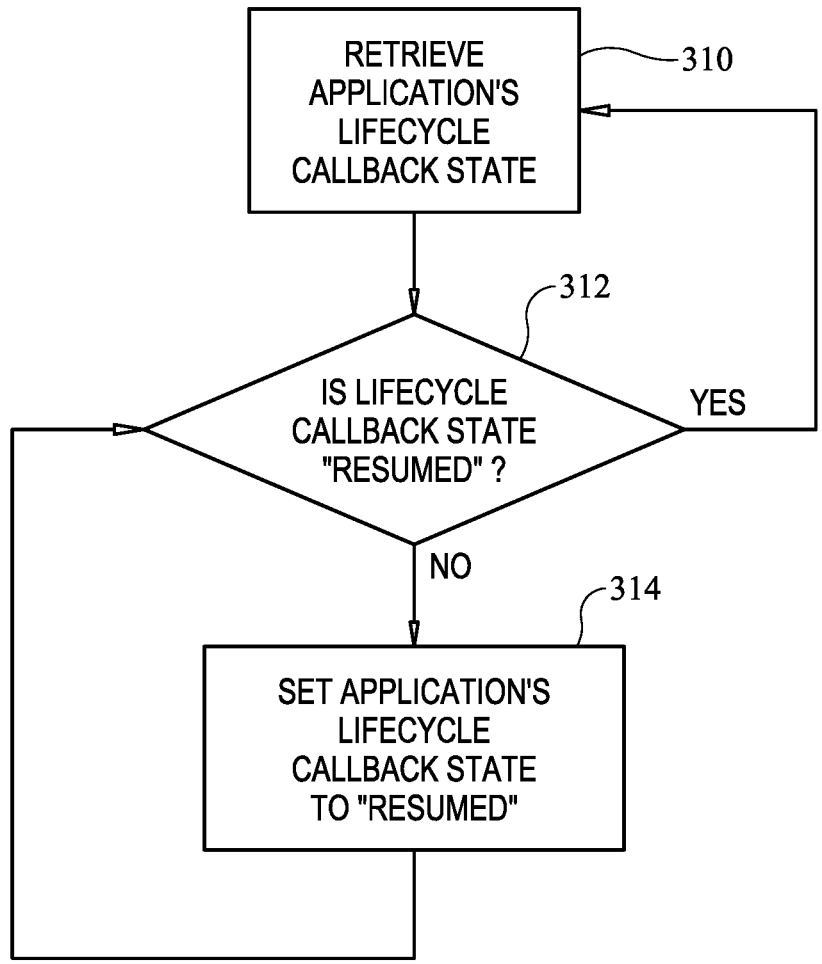
FIG. 6 is a flow diagram of another embodiment of a home screen GUI control process used in the home screen reformatting process of the present invention.

The home screen reformatting process of the present invention can be realized in a variety of embodiments without departing from the scope of the present invention. By way of non-limiting examples, several embodiments will be described herein with the aid of the flow diagrams illustrated in FIGS. 3, 6 and 7. In each flow diagram, communications to and between administrator device 12, protégé device 14, and server 18 are illustrated using solid lines of connectivity to boxes in the flow diagram. It is to be understood that such communications are carried out wirelessly over a network (not shown) such as network 16 as described earlier herein.

Figure 3:
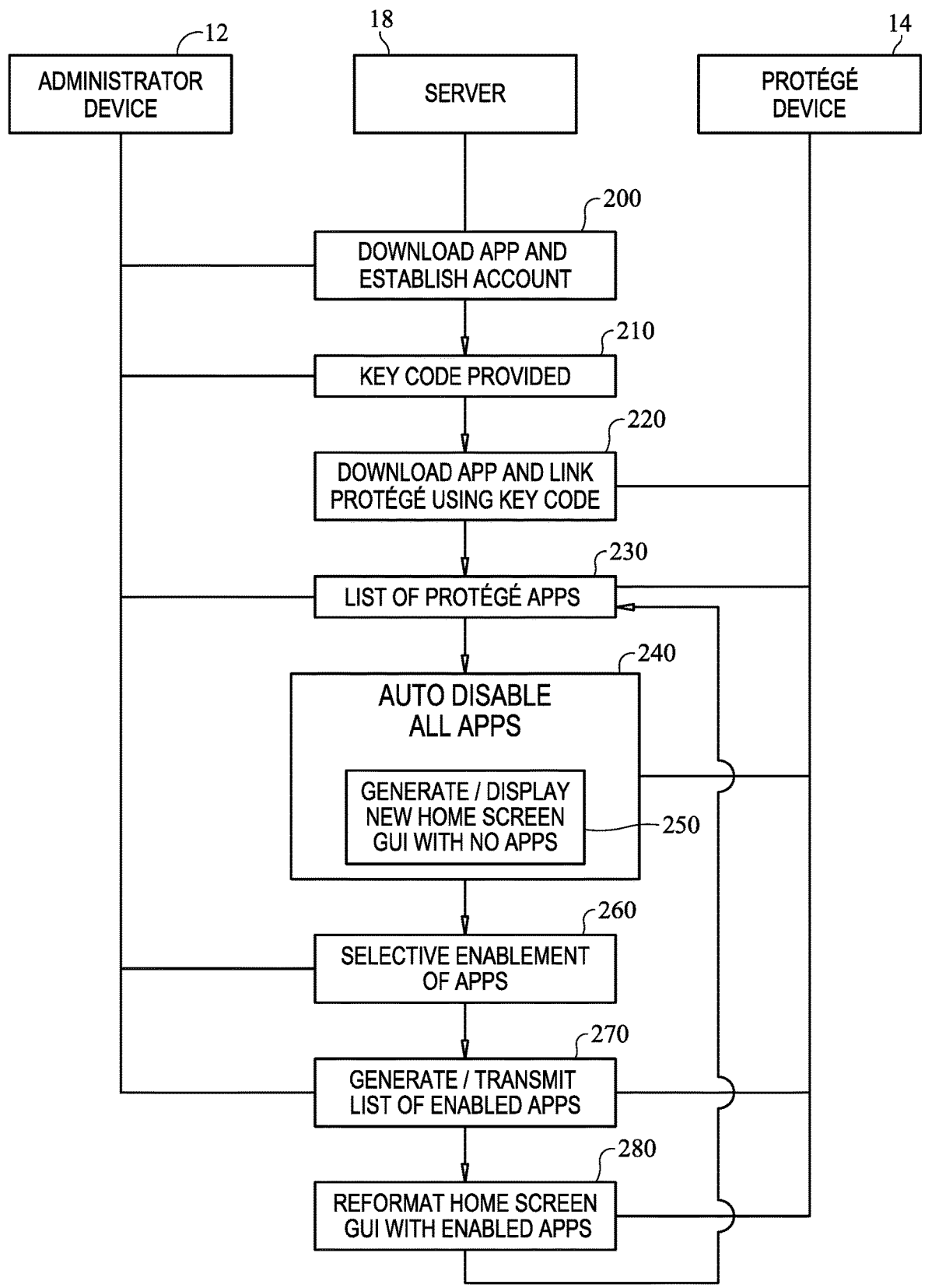
FIG. 3 is a flow diagram of a home screen reformatting process in accordance with an embodiment of the present invention.

In one embodiment illustrated in FIG. 3, the present invention commences with step 200 where a user of administrator device 12 downloads the present invention's application software or app (i.e., executable instructions) from server 18 and establishes an account. As described earlier herein, the user of administrator device 12 can be a parent/guardian, an employer, etc. Processes used for the establishment of a secure account to include payment information and username/password creation/storage/verification are well-known in the art and will not be described further herein. Once an account is created, a unique key code is provided via server 18 to administrator device 12 at step 210. The key code will be used to associate one (or more) protégé devices 14 with the account established at administrator device 12.

At step 220, a user of protégé device 14 downloads the application software or app (i.e., the present invention's set of executable instructions that will run on protégé device 14) and enters the afore-mentioned key code that is provided by the user of administrator device 12. Once the user of protégé device 14 enters the key code into the app, the executable instructions downloaded onto protégé device 14 (as well as those downloaded onto administrator device 12) cause the present invention's operation to execute as will now be explained.

At step 230, the home screen reformatting app running on protégé device 14 reads all the apps maintained on protégé device 14 to include those used for calling, texting, web browsing, games, social media, etc., and generates a list of those apps. The list of the loaded apps is uploaded to server 18 where they are available for viewing at administrator device 12. The user of administrator device 12 can then access and view the list of loaded apps at their display screen 126. For example, all loaded apps on protégé device 14 can appear in a list on display screen 126 with a "DISABLED" checked box next to each app in the list generated by step 230. An unchecked "ENABLE" box can also be provided next to each app in the list.

Simultaneously (or nearly simultaneously) with step 230, the home screen app running on protégé device 14 disables every loaded app on protégé device 14 at step 240. Such disabling can be accomplished in a variety of ways without departing from the scope of the present invention. In the illustrated embodiment, each downloaded app on protégé device 14 is effectively "disabled" by eliminating the app's launch icon from the home screen GUI presented on display 146 of protégé device 14. More specifically, at step 250, the home screen reformatting app running on protégé device 14 generates and displays a new and unique home screen GUI (on display screen 146) that clearly identifies to a user that the home screen reformatting app is running. That is, when the home screen reformatting app is launched, the present invention automatically and effectively disables all apps on protégé device 14 by presenting only a background image associated with the newly-generated home screen GUI without any of the launch icons for the apps downloaded on protégé device 14.

Figure 4A:
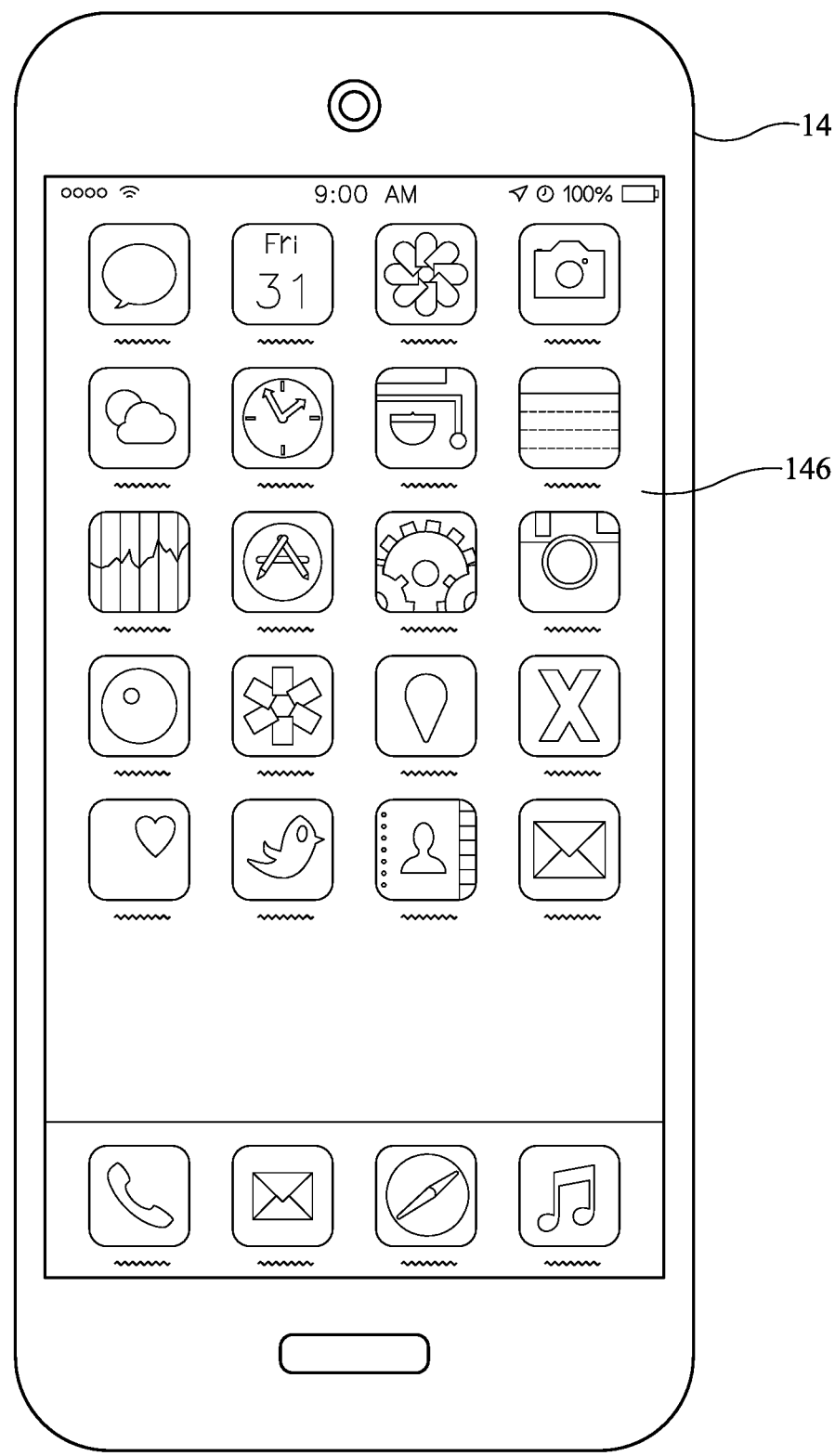
FIG. 4A depicts an exemplary prior art home screen GUI on a mobile computing device prior to activation of the home screen reformatting process of the present invention.
Figure 4B:
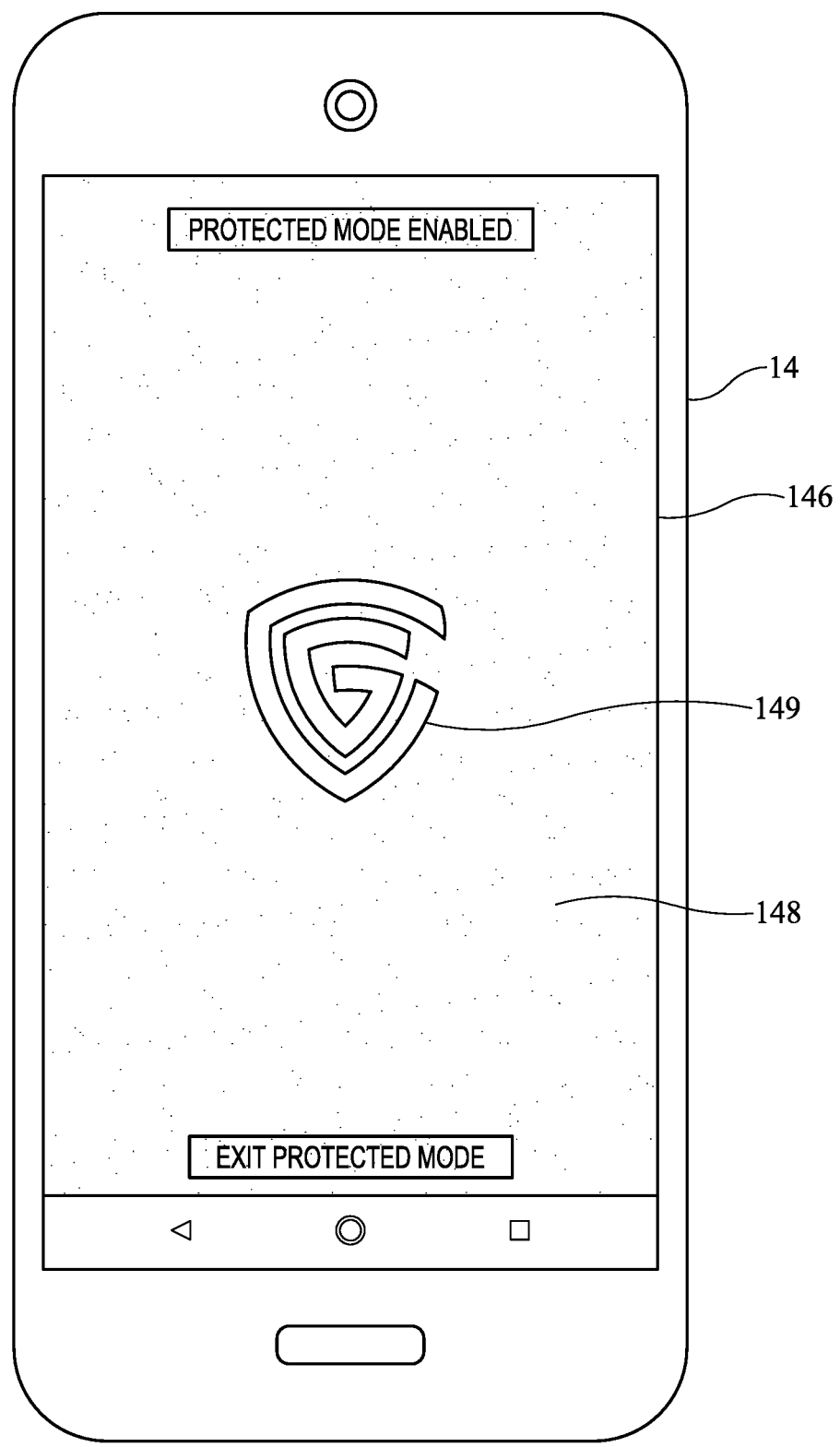
FIG. 4B depicts a reformatted home screen GUI on a mobile computing device following activation of the home screen reformatting process of the present invention but prior to enablement of any of the protégé device's loaded apps at the administrator device.

To illustrate this portion of the process, FIG. 4A illustrates an exemplary protégé device 14 before the home screen reformatting app is activated. That is, a typical and conventional home screen GUI is shown on screen display 146 where a number of launch icons associated with apps downloaded on protégé device 14 are displayed and are available to the user of protégé device 14. FIG. 4B illustrates the same protégé device 14 after the home screen reformatting app has been activated thereon. In this figure, the device's home screen GUI has been automatically reformatted to present a background image 148 resulting from step 250 in which no app launch icons are accessible to the user of protégé device 14. Background image 148 can be uniquely colored and can include one or more unique visual cues (e.g., a unique and prominent icon image 149) to clearly indicate that the home screen reformatting process is activated.

Figure 4C:
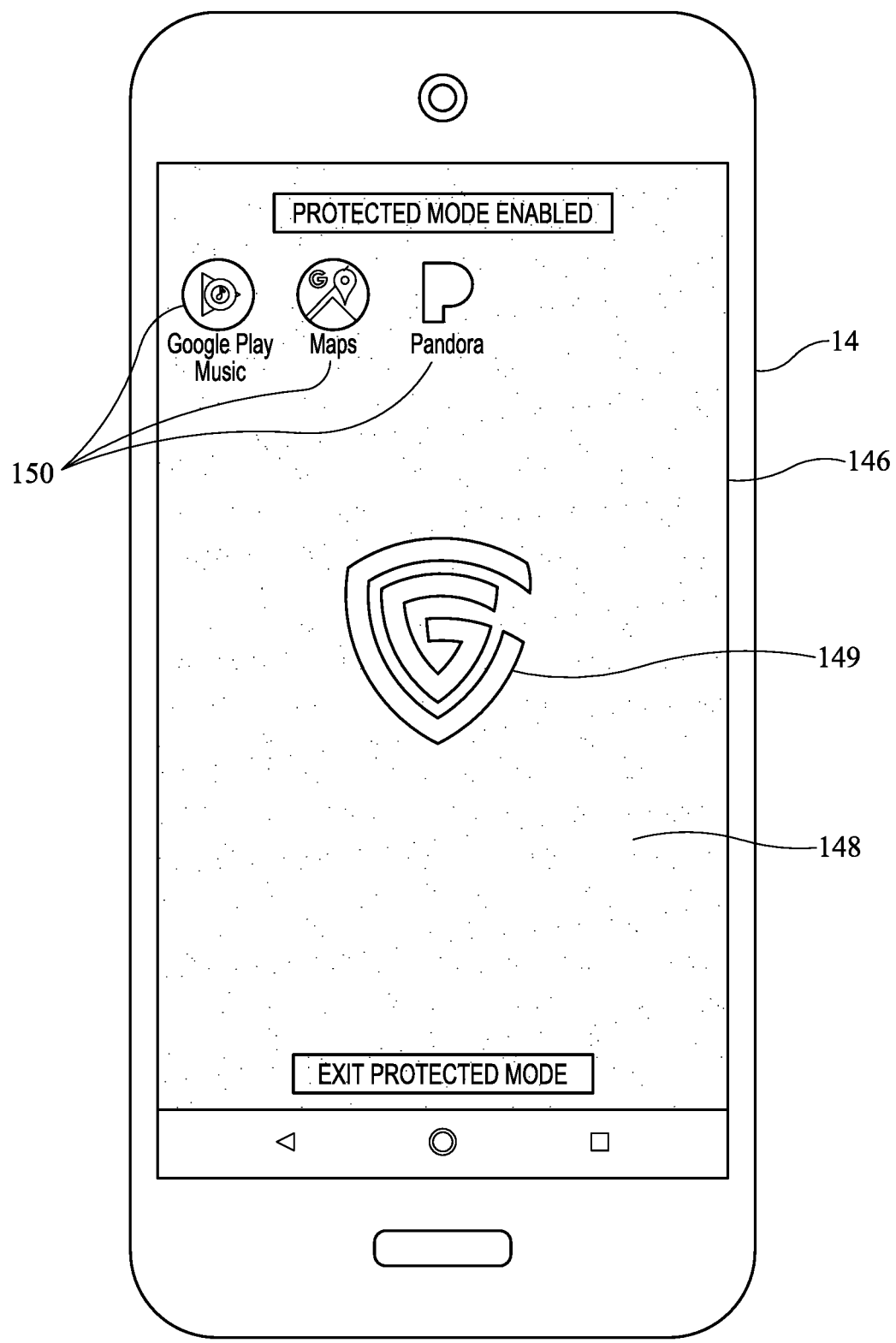
FIG. 4C depicts a reformatted home screen GUI on a mobile computing device following activation of the home screen reformatting process of the present invention subsequent to enablement of the protégé device's loaded apps at the administrator device.

Once the home screen reformatting app is running on protégé device 14, any app loaded on protégé device 14 can only be enabled by a user of administrator device 12 who must select and enable (at step 260) any of the automatically disabled apps before they can be placed on the home screen GUI of protégé device 14. Thus, the present invention allows a user of administrator device 12 to err on the side of caution and limit enabled apps to those they are completely comfortable with or until such time that a disabled app (or apps) can be properly evaluated. Once an app is selectively enabled at administrator device 12 via step 260, the home screen reformatting app running on administrator device 12 automatically generates a list of enabled user applications and transmits same at step 270 over network 16 to protégé device 14. The home screen reformatting app running on protégé device 14 then regenerates the protégé device's home screen GUI at step 280 to show the launch icon(s) associated with any enabled app appearing in the list transmitted at step 270. The result of this portion of the process is illustrated in FIG. 4C where the home screen GUI on screen display 146 has been automatically reformatted to include the background image 148 and icon image 149, as well as launch icons 150 that were enabled at administrator device 12 and generated/transmitted to protégé device 14 at step 270. Processing then returns to step 230 such that any subsequently or newly downloaded app is automatically added to the list of apps presented to administrator device 12 as "DISABLED", and will not appear on the reformatted home screen GUI of protégé device 14 until it is enabled at administrator device 12.

Figure 5:
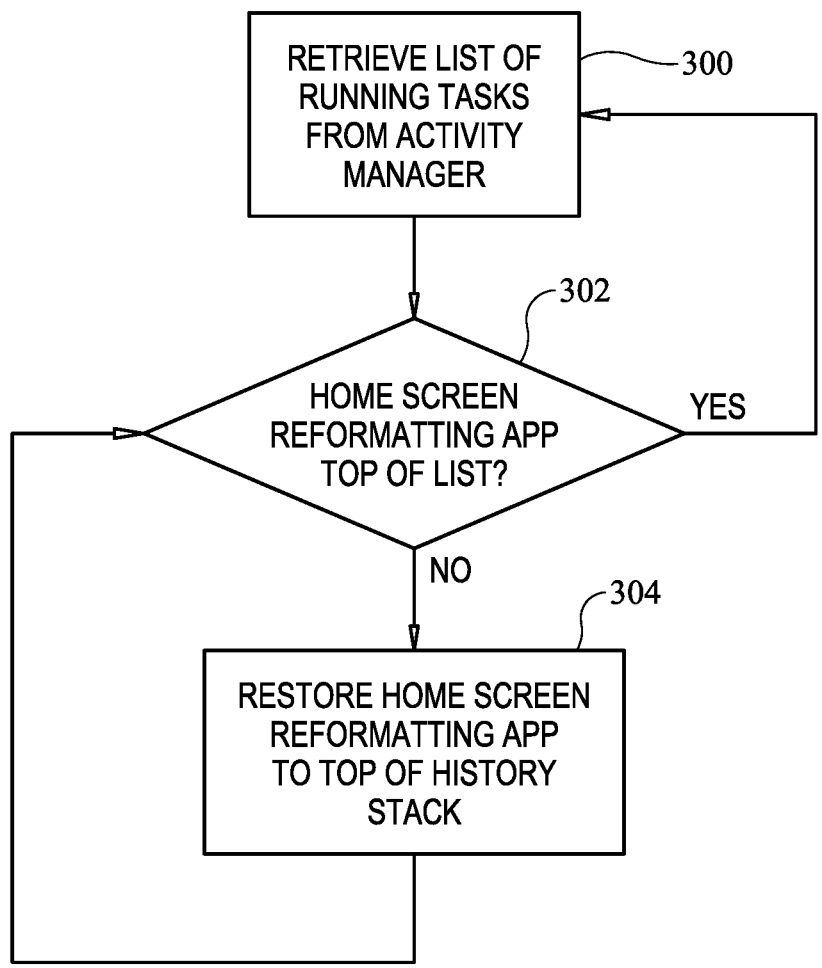
FIG. 5 is a flow diagram of an embodiment of a home screen GUI control process used in the home screen reformatting process of the present invention.

The present invention can employ unique approaches to controlling the home screen GUI so that it appears as shown in FIG. 4B or 4C during execution of the home screen reformatting app. Briefly, one unique control process monitors the running tasks on protégé device 14 to maintain control of the home screen GUI on protégé device 14. More specifically and with reference to the process flow diagram illustrated in FIG. 5, the present invention retrieves a list of running tasks from the Activity Manager on protégé device 14 at step 300. Next, at step 302, the Activity Manager's running task list is checked to see if the present invention's home screen reformatting app (i.e., the activity associated with step 250 described above) is at the top of the list. By definition, the top of an Activity Manager's running task list is the activity component that is at the top of the history stack of the task list as this indicates what the user of protégé device 14 is currently doing. If the home screen reformatting app is at the top of the history stack of running tasks, processing simply loops back to step 300 to continue monitoring of the Activity Manager's running tasks. However, if the home screen reformatting app is not at the top of the history stack, step 304 restores the home screen reformatting app to the top of the list thereby assuring that the home screen GUI will appear as illustrated in FIG. 4B or 4C.

Another unique approach to controlling the home screen GUI so that it always appears as shown in FIG. 4B or 4C during execution of the home screen reformatting app on protégé device 14 does not require obtaining lists of running tasks and/or monitoring any of the protégé device's running tasks maintained by the Activity Manager. Briefly, a second unique control process operates to continuously force the lifecycle callback state of the protégé device's home screen reformatting app to a "Resumed" state to assure that the app maintains control of the home screen GUI on protégé device 14. As is known in the art, an executing activity or app has a lifecycle callback state associated therewith indicative of how a user is interacting with an app on a device. In accordance with the present invention and with reference to the process flow diagram illustrated in FIG. 6, control step 310 commences upon start-up of the home screen reformatting app to retrieve the app's lifecycle callback state. At control step 312, the lifecycle callback state is checked to see if it is in the "Resumed" state. If the lifecycle callback state is any state (e.g., "Create" or "Start" when app is first started, "Paused" if the app is minimized, "Destroyed" if the app is exited, etc.) other than "Resumed", control step 314 sets the lifecycle callback state to "Resumed". The control process illustrated in FIG. 6 loops in a continuous fashion once the app is started to thereby continuously force the app into the foreground operation of protégé device 14.

Figure 7:
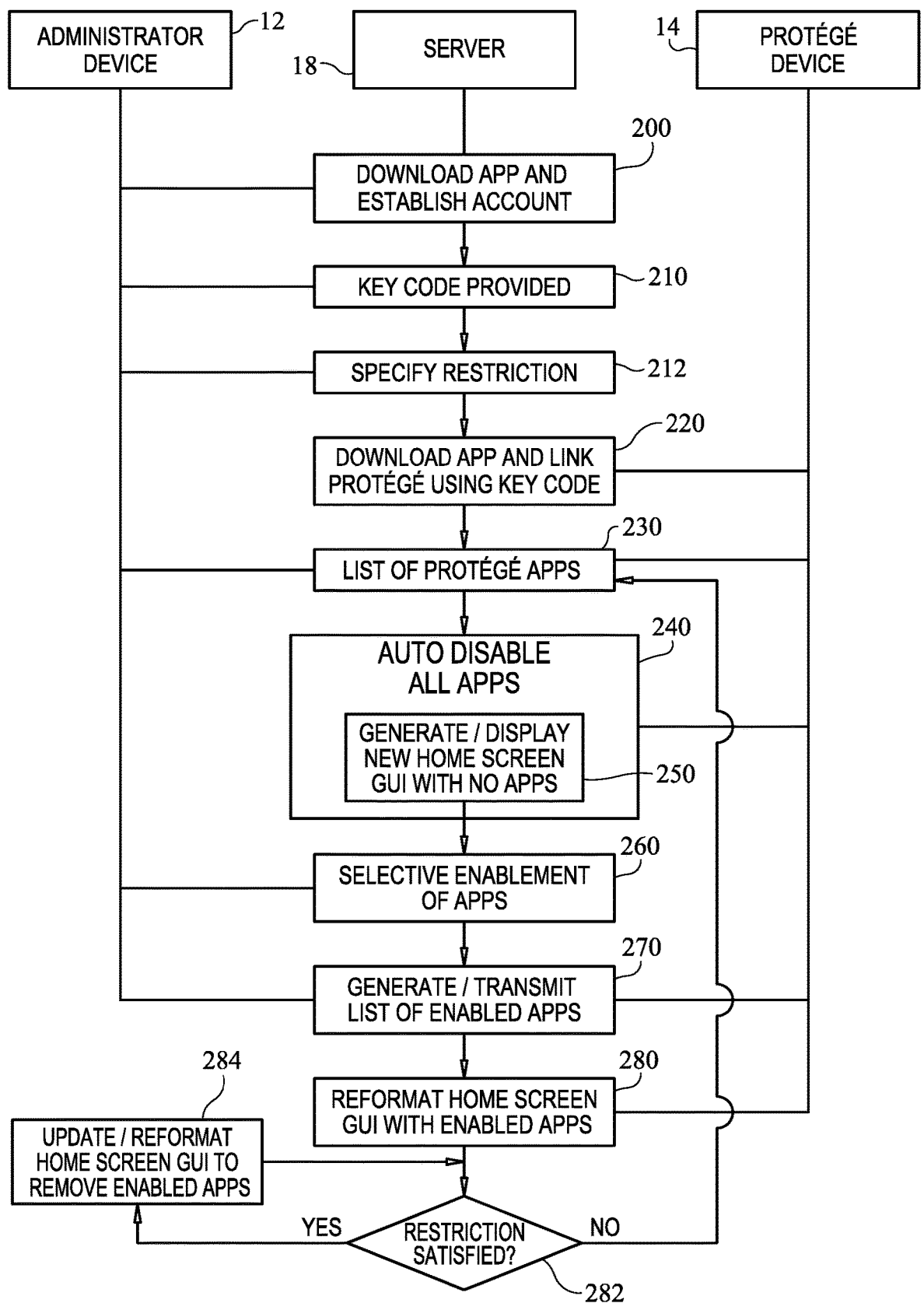
FIG. 7 is a flow diagram of a home screen reformatting process in accordance with another embodiment of the present invention.

In another embodiment of the present invention illustrated in FIG. 7, the above-described steps are supplemented with a restriction (or multiple restrictions) that can automatically prevent even enabled apps selected at step 260 from appearing on the protégé device's reformatted home screen GUI. More specifically and by way of an illustrative example, step 212 allows a user of administrator device 12 to specify one or more restrictions governing use of even selectively-enabled apps. For example, a restriction can be a speed restriction governing enablement/disablement of any selectively-enabled apps based on the speed at which protégé device 14 is moving as determined using GPS information available on protégé device 14. In this way, a user of administrator device 12 can set a speed threshold indicative of vehicle driving, bike riding, etc., above which even periodically-enabled apps (at step 260) will be automatically disabled. Accordingly, in furtherance of this embodiment, step 282 continually or periodically automatically compares the set restriction (e.g., a speed threshold) to a measurable attribute of protégé device 14 (e.g., speed at which protégé device 14 is traveling). If the restriction condition or threshold is not met, processing returns to step 230. However, if the restriction condition or threshold is satisfied, step 284 updates/reformats the home screen GUI to remove the enabled apps' icons from the home screen thereby preventing the launching thereof. Processing then returns to step 282 so that the restriction is continually or periodically monitored. In addition, when the restriction condition is met, the protégé device's sound and/or vibrate notifications can be disabled so that the user thereof receives no notification of an incoming call or message until the restriction condition is no longer satisfied.

Figure 8:
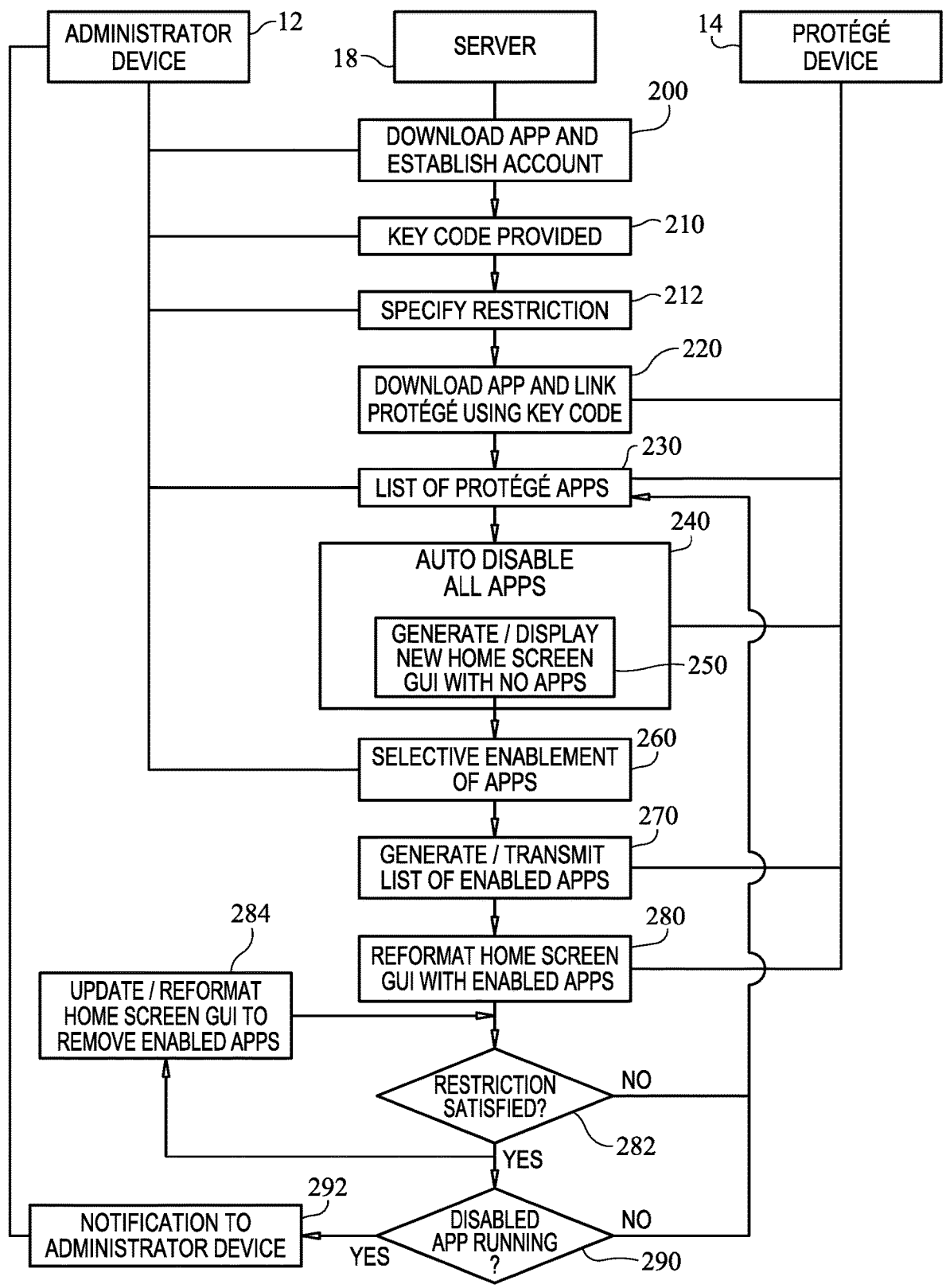
FIG. 8 is a flow diagram of a home screen reformatting process in accordance with still another embodiment of the present invention.

In yet another embodiment of the present invention illustrated in FIG. 8, the steps described in either the FIG. 3 or FIG. 7 embodiments can be further supplemented with background monitoring. For example, the process steps illustrated in FIG. 7 can be supplemented with a background operation of the home screen reformatting app that can detect attempts to circumvent the present invention as shown in FIG. 8. For example, step 290 can compare each app running on a protégé device 14 to the list of disabled apps remaining after auto-disabling step 240. If a user of protégé device 14 circumvents the home screen reformatting app and launches a disabled app, the "YES" result of comparison step 290 causes a notification step 292 to be implemented that causes a notification to be sent to administrator device 12 via server 18.

The advantages of the present invention are numerous. The home screen reformatting process eliminates the onus being placed on an administrator to examine all apps on a protégé device in order to determine which ones should not be allowed in general and in the presence of one or more restrictions. Instead, the present invention guarantees safety by disabling all currently-loaded apps and subsequently-loaded apps automatically. This places the burden for requesting app enablement on a protégé rather than requiring an administrator to monitor a myriad of downloaded apps.

Although the invention has been described relative to specific embodiments thereof, there are numerous variations and modifications that will be readily apparent to those skilled in the art in light of the above teachings. For example, one or more restrictions governing protégé-device-enabled apps can be provided as a default condition in the executable instructions (e.g., a default speed restriction). The present invention can be further supplemented with one or more administrator-defined restrictions such as location and/or time-of-day restrictions. In the case of a location restriction, the location of a protégé device is used to automatically disable all previously-enabled apps. A location restriction could be defined by the employer when the employer provides a mobile computer to the employee. For example, a location restriction could be set to only allow enabled apps to work in an employer workplace and then be disabled at all other locations. The location restriction could also be used by a parent/guardian to disable all previously-enabled apps on, for example, a school's grounds. In the case of a time-of-day restriction, an administrator can define a window of time (e.g., from 8 AM to 3 PM covering school hours when the administrator is a parent/guardian and the protégé is a child of school age, from 10 PM to 6 AM covering hours when a child should be sleeping, etc.) during which all loaded apps on the protégé device are disabled as described earlier herein. The present invention could further be configured to accept and process multiple restrictions without departing from the scope of the present invention. It is therefore to be understood that, within the scope of the appended claims, the invention may be practiced other than as specifically described.

What is claimed as new and desired to be secured by Letters Patent of the United States is:

1. A method of reformatting a home screen Graphical User Interface (GUI) on a mobile computer to depict only applications approved of at a host computer, said method comprising the steps of:

providing a GUI reformatting application to a subscriber for installation on a host computer, said GUI reformatting application including first executable instructions and second executable instructions, said first executable instructions being provided to the host computer over a network and being executable on the host computer, wherein said first executable instructions executing on the host computer request and receive a key code over the network;

transmitting said second executable instructions over the network to a mobile computer wherein said second executable instructions are activated on the mobile computer upon entry of the key code on the mobile computer, wherein the mobile computer has user applications installed thereon and has a home screen GUI displaying launch icons associated with the user applications, and wherein said second executable instructions automatically execute on the mobile computer to thereby cause automatic transmission of a first list of the user applications installed on the mobile computer to the host computer over the network wherein said first executable instructions generate a display of said first list on the host computer;

receiving, at the host computer, selections of the user applications in said first list wherein each of said selections identifies one of the user applications approved for enablement at the mobile computer;

generating a second list of enabled user applications at the host computer consisting of the user applications identified by said selections;

transmitting said second list to the mobile computer over the network; and automatically reformatting the home screen GUI on the mobile computer using said second executable instructions to display only the launch icons associated with said enabled user applications, wherein said step of automatically reformatting includes the step of continuously setting a lifecycle callback state of said second executable instructions to a "Resumed" state.

2. A method according to claim 1, wherein said step of automatically reformatting includes the step of generating a background image for the home screen GUI on the mobile computer to provide a visual indication that said GUI reformatting application is operational, and wherein the launch icons associated with said enabled user applications are caused to display on said background image.

3. A method according to claim 2, wherein only said background image for the home screen GUI is displayed on the mobile computer until said second list is received at the mobile computer.

4. A method according to claim 1 wherein, when a new user application is downloaded to the mobile computer after activation of said second executable instructions, said method further comprises the steps of:

adding the new user application to said first list; and retransmitting said first list to the host computer over the network wherein the new user application appears on said display of said first list on the host computer for selective addition to said second list.

5. A method according to claim 1, further comprising the steps of:

providing a restriction governing use of said enabled user applications; and monitoring the mobile computer to detect a condition indicative of said restriction, wherein said second executable instructions cause automatic reformatting of the home screen GUI on the mobile computer so that none of the launch icons associated with said enabled user applications are displayed when said condition is detected.

6. A method according to claim 5, wherein said restriction is based on at least one of a speed at which the mobile computer is traveling, a location of the mobile computer, and a time of day.

7. A method according to claim 1, wherein the mobile computer is selected from the group consisting of smartphones and wearable smart devices.

8. A method of reformatting a home screen Graphical User Interface (GUI) on a mobile computer to depict only applications approved of at a host computer, said method comprising the steps of:

providing a GUI reformatting application to a subscriber for installation on a host computer, said GUI reformatting application including first executable instructions and second executable instructions, said first executable instructions being provided to the host computer over a network and being executable on the host computer, wherein said first executable instructions executing on the host computer request and receive a key code over the network;

transmitting said second executable instructions over the network to a mobile computer wherein said second executable instructions are activated on the mobile computer upon entry of the key code on the mobile computer to thereby initiate a lifecycle callback state associated with said second executable instructions, and wherein the mobile computer has user applications installed thereon and has a home screen GUI displaying launch icons associated with the user applications;

automatically transmitting, using said second executable instructions, a first list of the user applications installed on the mobile computer to the host computer over the network;

automatically generating, using said first executable instructions, a display of said first list on the host computer;

receiving, at the host computer, selections of the user applications in said first list wherein each of said selections identifies one of the user applications approved for enablement at the mobile computer;

generating, using said first executable instructions, a second list of enabled user applications at the host computer consisting of the user applications identified by said selections;

transmitting said second list to the mobile computer over the network; and automatically reformatting the home screen GUI on the mobile computer, using said second executable instructions, to display only the launch icons associated with said enabled user applications, wherein said step of automatically reformatting includes the step of continuously setting the lifecycle callback state of said second executable instructions to a "Resumed" state.

9. A method according to claim 8, wherein said step of automatically reformatting includes the step of generating a background image for the home screen GUI on the mobile computer to provide a visual indication that said GUI reformatting application is operational, and wherein the launch icons associated with said enabled user applications are caused to display on said background image.

10. A method according to claim 9, wherein only said background image for the home screen GUI is displayed on the mobile computer until said second list is received at the mobile computer.

11. A method according to claim 8 wherein, when a new user application is downloaded to the mobile computer after activation of said second executable instructions, said method further comprises the steps of:

automatically adding the new user application to said first list; and automatically retransmitting said first list to the host computer over the network wherein said step of automatically generating causes the new user application to appear on said display of said first list on the host computer for selective addition to said second list.

12. A method according to claim 8, further comprising the steps of:

providing a restriction governing use of said enabled user applications; and monitoring the mobile computer to detect a condition indicative of said restriction wherein, when said condition is detected, said second executable instructions cause said step of automatically reformatting the home screen GUI on the mobile computer to include the step of preventing all the launch icons associated with said enabled user applications from being displayed on the mobile computer.

13. A method according to claim 12, wherein said restriction is based on at least one of a speed at which the mobile computer is traveling, a location of the mobile computer, and a time of day.

14. A method according to claim 8, wherein the mobile computer is selected from the group consisting of smartphones and wearable smart devices.

15. A method of reformatting a home screen Graphical User Interface (GUI) on a mobile computer to depict only applications approved of at a host computer, said method comprising the steps of:

providing a GUI reformatting application to a subscriber for installation on a host computer, said GUI reformatting application including first executable instructions and second executable instructions, said first executable instructions being provided to the host computer over a network and being executable on the host computer, wherein said first executable instructions executing on the host computer request and receive a key code over the network;

transmitting said second executable instructions over the network to a mobile computer wherein said second executable instructions are activated on the mobile computer upon entry of the key code on the mobile computer to thereby initiate a lifecycle callback state associated with said second executable instructions, and wherein the mobile computer has user applications installed thereon and has a home screen GUI displaying launch icons associated with the user applications;

automatically transmitting, using said second executable instructions, a first list of the user applications installed on the mobile computer to the host computer over the network;

automatically generating, using said first executable instructions, a display of said first list on the host computer;

receiving, at the host computer, selections of the user applications in said first list wherein each of said selections identifies one of the user applications approved for enablement at the mobile computer;

generating, using said first executable instructions, a second list of enabled user applications at the host computer consisting of the user applications identified by said selections;

providing a restriction governing use of said enabled user applications;

transmitting said second list to the mobile computer over the network;

automatically reformatting the home screen GUI on the mobile computer, using said second executable instructions, to display only the launch icons associated with said enabled user applications, wherein said step of automatically reformatting includes the step of continuously setting the lifecycle callback state of said second executable instructions to a "Resumed" state, and wherein said step of automatically reformatting includes the step of generating a background image for the home screen GUI on the mobile computer to provide a visual indication that said GUI reformatting application is operational, and wherein the launch icons associated with said enabled user applications are caused to display on said background image; and monitoring the mobile computer to detect a condition indicative of said restriction wherein, when said condition is detected, said second executable instructions cause said step of automatically reformatting the home screen GUI on the mobile computer to include the step of preventing all the launch icons associated with said enabled user applications from being displayed on the mobile computer.

16. A method according to claim 15, wherein only said background image for the home screen GUI is displayed on the mobile computer until said second list is received at the mobile computer.

17. A method according to claim 15 wherein, when a new user application is downloaded to the mobile computer after activation of said second executable instructions, said method further comprises the steps of:

automatically adding the new user application to said first list; and automatically retransmitting said first list to the host computer over the network wherein said step of automatically generating causes the new user application to appear on said display of said first list on the host computer for selective addition to said second list.

18. A method according to claim 15, wherein said restriction is based on at least one of a speed at which the mobile computer is traveling, a location of the mobile computer, and a time of day.

19. A method according to claim 15, wherein the mobile computer is selected from the group consisting of smartphones and wearable smart devices.

* * * * *